J. KARHU.
BREAD CUTTER.
APPLICATION FILED NOV. 1, 1909.

993,173.

Patented May 23, 1911.
2 SHEETS—SHEET 1.

Witnesses.

Inventor
John Karhu.

By
Attorneys.

J. KARHU.
BREAD CUTTER.
APPLICATION FILED NOV. 1, 1909.

993,173.

Patented May 23, 1911.

2 SHEETS—SHEET 2.

Witnesses

Inventor
John Karhu.
By
Attorneys

UNITED STATES PATENT OFFICE.

JOHN KARHU, OF CALUMET, MICHIGAN.

BREAD-CUTTER.

993,173.  Specification of Letters Patent.  Patented May 23, 1911.

Application filed November 1, 1909. Serial No. 525,724.

*To all whom it may concern:*

Be it known that I, JOHN KARHU, a citizen of the United States, residing at Calumet, in the county of Houghton, State of Michigan, have invented certain new and useful Improvements in Bread-Cutters; and I do hereby declare the following to be a full, clear, and exact description of the invention, such as will enable others skilled in the art to which it appertains to make and use the same.

This invention relates to improvements in bread cutting machines.

One object of the invention is the provision of a bread cutting machine designed to cut loaves of bread in the direction of their lengths or widths preparatory to rebaking or toasting the bread.

Another object is the provision of a bread cutting machine provided with a rotary knife or cutter and a feeder or carrier designed to convey the loaves of bread to the knife.

With the above and other objects in view as will more fully hereinafter appear, the present invention consists in certain novel details of construction and arrangement of parts, hereinafter fully described, illustrated in the accompanying drawings and more particularly pointed out in the appended claim.

Figure 1:
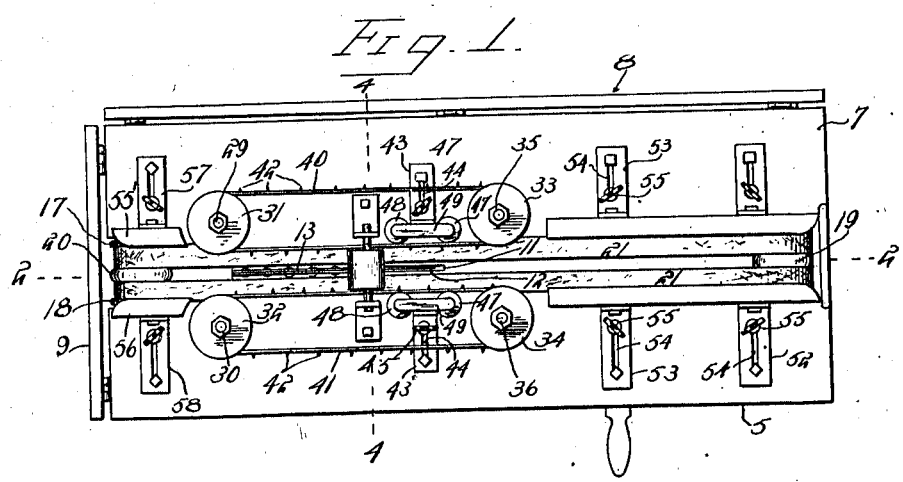
Figure 2:
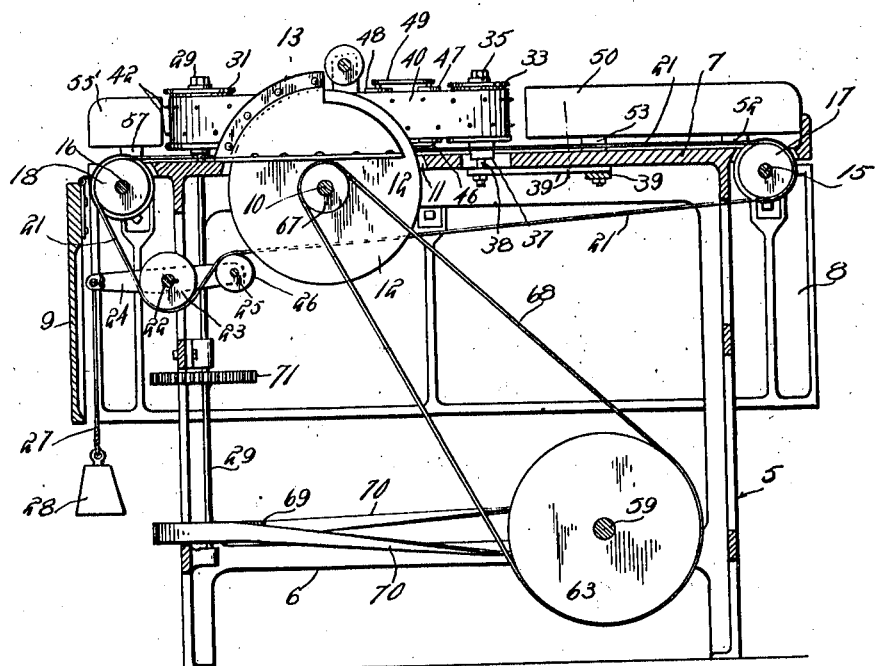
Figure 3:
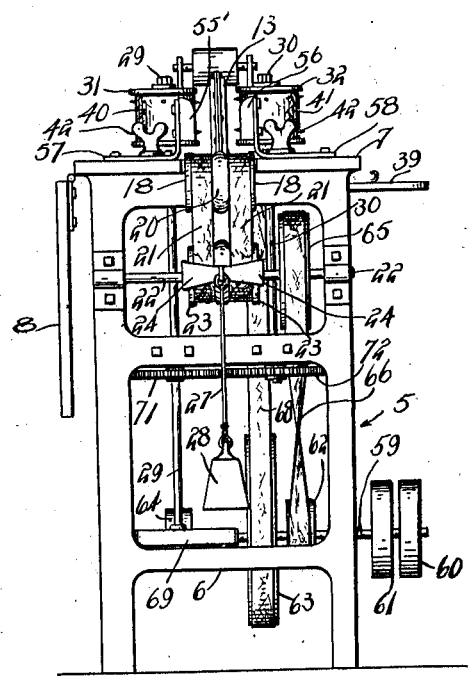
Figure 4:
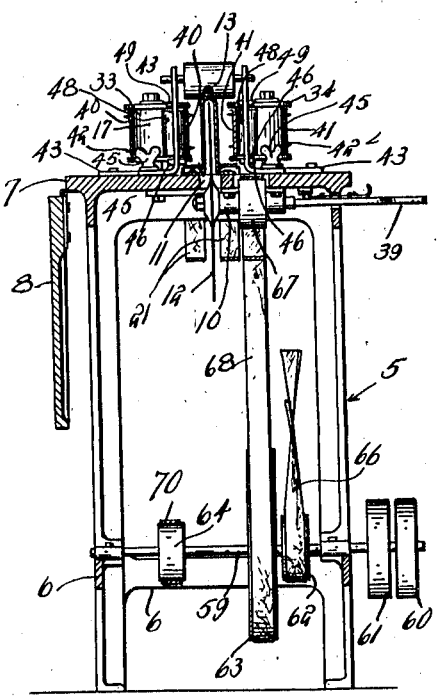
Figure 5:
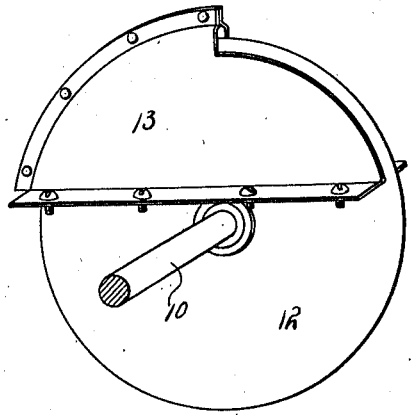
Figure 6:
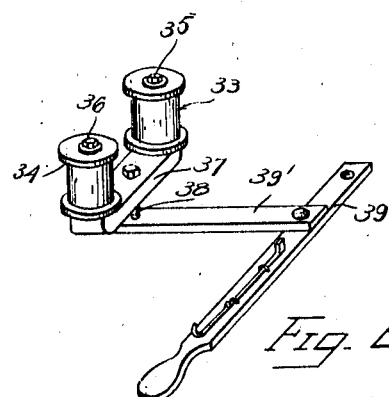

In the accompanying drawings forming part of the specification:—Figure 1 is a plan view of the device. Fig. 2 is a longitudinal sectional view on line 2—2 of Fig. 1. Fig. 3 is an end elevation of the device. Fig. 4 is a transverse sectional view on the line 4—4 of Fig. 1. Fig. 5 is a detailed perspective of the cutter and casing. Fig. 6 is a similar view of the tightening device for the carrier.

Similar numerals of reference are employed to designate corresponding parts throughout.

The device comprises a supporting frame including in its construction four-corner standards or uprights designated by the numeral 5. The upper, lower and intermediate portions of these uprights are connected by the webs or cross pieces 6. The uprights or standards support a plane top 7, the whole conforming to the shape of a table. Hingedly united to one of the longitudinal sides of the top is a leaf 8 corresponding in length to the length of the top, or substantially so, and similarly united to one end of the top is a similar leaf 9 corresponding to the width of the top, or substantially so, and also to the width of the leaf 8. These leaves when folded outwardly and in a plane with the top hold the bread to be cut and after the same has been operated upon.

The knife or cutter shaft is designated by the numeral 10 and extends transverse the top 7 and is journaled in hangers depending from the lower face of said top and located adjacent the horizontal center thereof. That portion of the top directly above the shaft 10 is provided with a longitudinal slot 11, extending for a short distance and located at the longitudinal central line of the top 7. The knife or cutter is designated by the numeral 12 and is keyed to the shaft 10 and extends upwardly through the slot 11 and above the top 7. That segment of the knife or cutter located adjacent that end of the top provided with the leaf 9 is covered by a channeled casing 13, constructed to permit free rotation of the knife therein and to prevent particles of the material from flying upwardly and out of the machine.

The opposite ends of the top 7 are centrally provided with inwardly extending slots or recesses of considerably greater width than the slot 11 through which the knife 12 extends, and depending from the lower face of the top and on either side of these recesses are hangers corresponding in length to the hangers which support the shaft 10. Journaled in these hangers are a pair of shafts 15 and 16, in a horizontal plane with the knife supporting shaft 10, and keyed to the shafts 15 and 16 are a pair of pulleys 17 and 18, of sizes to nicely fit within the recesses. The diameters of these pulleys are such that the upper sides of the pulleys will be a trifle above the horizontal plane of the upper face of the top 7 and considerably below the knife or cutter 12. The pulleys 17 and 18 are medially provided with circumferential collars 19 and 20, which serve to hold the carrier, to be presently described, spaced on the pulleys.

The carrier in the present instance is designated by the numeral 21 and is shown to consist of a pair of endless belts which are trained over the pulleys 17 and 18 and on either side of the circumferential collars 19 and 20. In order that the belts constituting the carrier may be held at all times comparatively taut, the following construction is employed:—Extending laterally from the rear faces of the standards 5 adjacent the end leaf 9 are a pair of bracket arms located considerably below the planes of the shafts 15 and 16 supporting the pulleys 17 and 18. Journaled in these brackets are the opposite ends of a shaft 22. Journaled on the shaft 22 and in an inclined plane with the pulleys 17 and 18 is an idler 23, under which the belts constituting the carrier are trained. Journaled on the shaft 22 at either end of the pulley 23 are the intermediate portions of a pair of beams 24; the lengths of these beams are considerably greater than the diameter of the pulley 23 so that the opposite ends of the beams, it being understood that the latter are normally disposed in a horizontal plane, extend for equal distances in advance of the opposite sides of the pulley 23. What will subsequently be termed the forward ends of these beams or those farthest removed from the end of the top bearing the leaf 9 terminate at a point adjacent the knife or cutter 12 and are connected by a transversely arranged shaft 25, on which is journaled a second idler 26, similar to the first-named idler 23 and over which is trained the carrier 21. The opposite ends of the beams 24 are connected by a rod 27, and supported by a suitable cord or cable from the intermediate portion of this rod is a weight 28. With this construction it is evident that an upward force will be exerted by the pulley 26 on the belts produced by the downward pull of the weight 28, whereby the said belts will at all times be maintained in taut position.

It might here be stated, that the belts are arranged on either side of the disk or cutter 12 and with this construction it is evident when the carrier is moving in one direction or toward that end of the top to which the leaf 9 is secured that an object placed on the carrier at the opposite end of the top will, by the said carrier, be carried to the cutting edge of the knife.

To positively hold the loaves against lateral movement while being carried and the knife passing through the loaves a pair of endless grippers are employed. These grippers rotate in planes at right angles to the plane in which the carrier rotates and are located on opposite sides of the carrier and cutting disk.

By reference now to Figs. 1 to 4 inclusive it will be seen that journaled in a pair of brackets adjacent the lower ends of the standards 5 are the lower ends of a pair of shafts 29 and 30. The upper ends of these shafts extend through openings in the upper end of the top 7 and adjacent the end provided with the leaf 9. Keyed to the upper ends of the shafts 29 and 30 and disposed above the endless carrier 21 are a pair of drums 31 and 32, arranged on either side of the carrier 21. A second pair of drums similar to the first-named drums are designated by the numerals 33 and 34. The last-named drums are journaled on a pair of spindles 35 and 36, extending upwardly from the opposite ends of a cross piece 37. It might here be stated that the first-named drums 31 and 32 are arranged between one side of the knife or disk and that end of the top to which the end leaf is pivoted, while the last-named drums 33 and 34 are located between the opposite sides of the knife or disk and opposite end of the table. As before stated the last-named drums 33 and 34 are mounted for movement on a pair of spindles carried by a cross piece 37 and depending from the intermediate portion of the cross piece 37 is a short shaft 38, which extends through an elongated slot formed in the top 7 and between the slot 11 for the knife or disk 12 and that end of the top remote from the end to which the leaf 9 is pivoted. A lever designated by the numeral 39 has one end pivoted to the lower face of the top 7 and between the drums 33 and 34 and adjacent end of the top, and connection is established between the short shaft 38 and intermediate portion of the lever by means of a connecting rod 39', the opposite ends of which are pivoted to the short shaft and intermediate portion of the lever. Thus it will be seen when the lever is oscillated that the distance between the drums 31 and 32 and 33 and 34 will be increased or diminished. An arcuate rack is supported from the lower face of the top 7 and in a plane parallel with the latter and the outer end of the lever which extends beyond one of the sides of the top is located between the said rack and top, in this connection the lever is provided with a pawl adapted to engage with the teeth of the rack so that movement of the lever will be prevented when the pawl is in engagement with the rack.

Trained over the pulleys 31 and 33 and arranged on one side of the carrier and cutter disk is an endless belt 40 and trained over the drums 32 and 34 on the opposite side of the cutter disk and parallel with the endless belt 40 is a similar endless belt 41. The outer surfaces of these belts are provided with a plurality of barbs 42, the whole constituting a pair of grippers, designed to hold the bread in position on the carrier during the cutting operation.

An adjusting device is provided for the grippers and is located adjacent the forward drums 33 and 34 or those farthest removed from the end to which the leaf 9 is secured. The adjusting members are so positioned that they will bear on the inner faces of the outer sides of the belts 40 and 41 and by moving them transverse the top 7 the distance between the opposed inner surfaces of the belts may be increased or diminished. This will be found desirable when loaves of comparatively small widths are to be cut. Each of the adjusting members consists of an oblong plate 43, designed to bear on the upper surface of the top 7. The plate 43 is provided with an elongated slot 44, which receives a set screw 45, the threaded shank of the set screw entering a threaded opening formed in the top 7. Thus it will be seen by moving the plate 43 transverse the top 7 and then turning the set screw 45, the said plate will be fixedly secured in adjusted position. Arranged on the inner end of the plate 43 is a transverse arm 46 corresponding approximately to the length of the plate 43, and rising from the opposite ends of the arm 46 are a pair of spindles upon which are journaled a pair of spools 47 and 48, corresponding in length to the length of the drums, or substantially so. The upper ends of the shafts on which the spools are journaled extend for a short distance above the upper ends of the spools and are connected by means of a transversely disposed cross piece 49, which serves to brace the shafts in upright position. With this construction it is evident when the spools 48 and 47 bear outwardly on the inner surfaces of the belts, as before described, one side of the belt will bulge toward the knife or cutter 12.

In order to hold the loaves in position on the carrier before the said loaves come into engagement with the grippers, a pair of guides 50 and 51 are employed. These members are preferably formed of oblong pieces of wood corresponding approximately to the width of the grippers. The guides are supported on one of their longitudinal edges and are movable to and from each other so as to receive loaves of varying widths. Each guide is held supported by means of a pair of oblong plates 52 and 53. These plates are centrally provided with oblong slots 54, which receive set screws 55, the threaded shanks of the latter being threadable into openings formed in the top 7. The inner ends of the plates are upturned and fixedly secured to the outer faces of the guides. The lengths of the guides correspond approximately to the distance between the drums 33 and 34 and adjacent end of the plate 7. A similar pair of guides 55' and 56 are arranged between the drums 31 and 32 and opposite end of the top 7. These guides 55' and 56 are adjustable similar to the guides 50 and 51 and are secured to a pair of plates 57 and 58, similar to the plates 52 and 53.

The main driving shaft for the machine is designated by the numeral 59 and is journaled in a pair of side cross pieces located adjacent the lower ends of the uprights or standards 5. One end of this shaft extends in advance of one side of the frame and is provided with a drive wheel 60, and an idler 61. That portion of the shaft disposed between the frames and uprights is provided with three pulleys designated respectively by the numerals 62, 63 and 64. The pulley 62 or that adjacent the drive wheel 60 is in alinement with a similar pulley 65 keyed to the shaft 22 to which the carrier 21 is connected. Connection between the pulleys 62 and 65 is established by means of a belt 66, this belt being formed so that the pulleys 62 and 65 will rotate in opposite directions. The intermediate pulley 63 or that adjacent to the pulley 62 is in direct alinement with a similar pulley 67 keyed to the knife bearing shaft 10, connections between the pulleys 63 and 67 being established by means of a belt 68. The pulley 64 adjacent that end of the shaft 59 remote from the drive wheel 60 is in a horizontal plane with a pulley 69 keyed to the lower end of the shaft 29 to which the drum 31 is secured, and connection between the pulleys 64 and 69 is established by means of a belt 70. The shaft 29 is intermediately provided with a crown gear 71, the teeth of which mesh with a similar crown gear 72 keyed to the intermediate portion of the opposite shaft 29. When the parts are connected as just described it will be obvious when the driving shaft rotates that similar movement will be imparted to the cutter, carrier and grippers so that a loaf placed upon the carrier at that end of the table remote from the end to which the leaf is pivoted, will be carried through the guides and thence to the grippers, the latter holding the loaf in position while the cutter passes therethrough. After the loaf has been cut, it being understood that the leaf at one end of the table has been partially raised, the loaf will be carried to the leaf by the carrier and fall into a suitable receptacle located below the leaf.

Thus it will be seen that I have provided a device which is exceedingly simple in structure and comparatively inexpensive to manufacture, embodying few parts and these so arranged that the danger of derangement will be reduced to a minimum.

What is claimed as new, is:—

. A bread cutter including a supporting table, a rotary disk cutter carried by said table, a pair of endless carriers arranged one on either side of and traveling in a plane perpendicular to the plane of the disk cutter, sheaves on either side of the cutters, a pair of endless grippers trained over said sheaves, said grippers overlying the carriers and confronting the sides of the cutter, a sheave of each gripper being movably mounted on said table, a link connecting said sheaves, a lever fulcrumed on said table and connected to said link for simultaneously actuating said movable sheaves whereby to hold the grippers taut, and a pair of brackets adjustably mounted on said table and carrying idlers which bear against each endless gripper, said brackets being movable toward or away from each other whereby to permit of various sized loaves being engaged between said grippers.

In testimony whereof, I affix my signature, in presence of two witnesses.

JOHN KARHU.

Witnesses:
W. F. GALBRAITH,
S. SILVOLA.